United States Patent Office 3,806,503
Patented Apr. 23, 1974

3,806,503
STEROID ESTERS AND A PROCESS FOR
THEIR PREPARATION
Sigfrid Schwarz, Jena, Germany, assignor to
VEB Jenapharm, Jena, Germany
No Drawing. Filed Nov. 12, 1969, Ser. No. 876,095
Int. Cl. C07c 169/08, 173/10
U.S. Cl. 260—239.5                          21 Claims

ABSTRACT OF THE DISCLOSURE

Novel esters of steroids having the formula $$(R_1-SO_2-O)_nA$$

wherein A is an n-valent steroid radical, $R_1$ is alkyl having at least 2 carbon atoms, cycloalkyl, aralkyl, alkoxy, cycloalkoxy, aroxy, aralkoxy, alkaryloxy, N,N-dialkylamino, N-alkyl-N-cycloalkyl amino, N-acyl-N-aryl amino or polymethyleneimino and $n$ is 1 or 2, prepared by reacting an acid halide of the formula $R_1-SO_2-X$, wherein X is fluorine, chlorine, bromine, or iodine with a steroid compound having the formula $A(OH)_n$ where A and $n$ are as defined above. The new esters are characterized by improved androgenic, anabolic, gestational and estrogenic activities.

BACKGROUND OF THE INVENTION

The present invention relates to new steroid esters and to a method for their preparation.

Steroid compositions have been made with at least one group of the formula $R_2-SO_2-O$ wherein $R_2$ was methyl, phenyl or substituted phenyl.

It is known in the art to prepare such steroid compounds having at least one group corresponding to $$R_2-SO_2-O$$

by reacting an acid chloride of the formula $R_2-SO_2-Cl$ with a steroid alcohol or phenol in the presence of pyridine. However, the reaction does not, or substantially does not take place if an acid chloride of the formula $R_1-SO_2-Cl$ in which $R_1$ is alkyl having at least 2 carbon atoms, cycloalkyl, aralkyl, alkoxy, cycloalkoxy, aroxy, aralkoxy, alkaryloxy, N,N-dialkylamino, N-alkyl-N-cycloalkylamino, N-acyl-N-arylamino or polymethyleneimino, are used in the reaction with the steroid alcohol or phenol in the presence of pyridine. This is also true even if a high molar excess of acid chloride and/or pyridine and extremely long reaction times and/or high reaction temperatures are applied.

An object of the invention is therefore to provide new steroid esters having at least one $R_1-SO_2-O$ group which are therapeutically useful and which are characterized by their prolonged depot action.

Another object of the invention is to provide a process for the preparation of new steroid esters having at least one $R_1-SO_2-O-$ group which are therapeutically useful and which are characterized by their prolonged depot action.

A further object of this invention is to provide a simple and economical method for the preparation of the new steroid esters.

The invention concerns steroid esters of the formula $(R_1-SO_2-O)_nA$, wherein A is an n-valent steroid radical, $R_1$ is alkyl having at least 2 carbon atoms, cycloalkyl, aralkyl, alkoxy, cycloalkoxy, aroxy, arakoxy, alkaryloxy, N,N-dialkylamino, N-alkyl-N-cycloalkyl amino, N-acyl-N-arylamino, or polymethyleneimino, and $n$ is 1 or 2.

The steroid esters of the invention can be prepared by reacting an acid halide of the formula $R_1-SO_2-X$ wherein $R_1$ has the above-identified meaning and X is a member selected from the group consisting of fluorine, chlorine, bromine and iodine, with a compound of the formula $A(OH)_n$ wherein A and $n$ have the above-designated meanings.

DESCRIPTION OF THE PREFERRED EMBODIMENTS

Preferably, the process of the invention is carried out in the presence of a sterically hindered amine. The presence of a sterically hindered amine generally allows for quantitative yields of the steroid esters of the invention.

Any suitable acid halide of the formula $R_1-SO_2-X$ in which R and X have the above-identified meanings can be used according to the invention. Acid chlorides are preferred. Any suitable compound of the formula $A(OH)_n$ in which A and $n$ have the above-identified meanings is useful as starting material. The following compounds are given as examples of suitable starting materials: $C_2H_5-SO_2-F$, $C_2H_5-SO_2-Cl$, $$C_2H_5-SO_2-Br$$

$C_2H_5-SO_2-I$, $C_3H_7-SO_2-Cl$, $C_4H_9-SO_2-Cl$ $C_5H_{11}-SO_2-Br$, $C_6H_{13}-SO_2-Cl$, $C_8H_{17}-SO_2-Cl$, $C_6H_{11}-SO_2-Cl$, $C_5H_9-SO_2-Br$ $C_6H_5-CH_2-SO_2-Cl$, $C_{10}H_7-CH_2-SO_2-Cl$ $CH_3-O-SO_2-Cl$, $C_2H_5-O-SO_2-Br$ $C_4H_9-O-SO_2-Cl$, $C_6H_{11}-O-SO_2-Cl$ $C_5H_9-O-SO_2-I$, $C_6H_5-O-SO_2-Cl$ $C_{10}H_7-O-SO_2-Cl$, $C_6H_5-CH_2-O-SO_2-Cl$ $C_6H_5-CH_2-CH_2-O-SO_2-Cl$ $C_2H_5-C_6H_4-O-SO_2-Cl$, $(CH_3)_2-N-SO_2-Cl$ $(C_2H_5)_2-N-SO_2-Br$, $(C_3H_7)_2-N-SO_2-Cl$ $(CH_3)(C_6H_{11})-N-SO_2-Cl$ $(CH_3-CO)(C_6H_5)-N-SO_2-Cl$, $(CH_2)_4-SO_2-Cl$ $(CH_2)_5-N-SO_2-Br$, compounds which are derived from cholestane, pregnane, androstane and estrane.

Any suitable esterically hindered amine can be used according to the the invention, such as for example 2,6-dimethyl pyridine, 2,4,6 - trimethyl pyridine, triethylamine, triisopropylamine, bis - trimethyl - silyl amine, etc. It is preferred to carry out the reaction in an inert solvent, as for example a hydrocarbon, i.e., benzene, a halogenated hydrocarbon, i.e., chlorobenzene, and trichloroethylene, an ester, i.e., acetic acid ethyl ester, a ketone, i.e. acetone.

The steroid esters of the invention are new and can only be obtained by the process of the invention, generally in quantitative yields. They have valuable pharmacological properties and have been found to possess androgenic, anabolic, gestational or estrogenic activity, which activity is maintained over prolonged periods following a single application. This depot effect is of particular significance for the application of the compounds of the invention in long-term therapy.

The following examples describe the manner and process of making and using the invention but are not to be construed as limiting the same.

EXAMPLE 1

17α-ethinyl-3-(propane-2-sulfonyloxy)-17β-hydroxy-1,3,5(10)estratriene 1 g. 17α - ethinyl - 3 - hydroxy - 17β - trimethyl silyloxy-1,3,5(10)-estratriene was dissolved in 28 ml. of a mixture of benzene and triethylamine and to this solution 1.22 ml. propane - 2 - sulfonyl chloride were added under stirring at room temperature. The reaction mixture was kept for 2 hours at room temperature and then poured onto ice. After decomposition of excess acid chloride, the solution was extracted with ether. The combined extracts were washed with water until neutrality, dried over sodium sulfate and the solvent thereafter removed. In order to decolorize the resulting residue, it was dissolved in a small amount of benzene, filtered through a thin layer of aluminum oxide (neutral, activity degree I) and the benzene removed in vacuo. A colorless crystalline crude product was obtained which was recrystallized from acetone/n-hexane. 2.1 g. 17α - ethinyl - 3 - (propane-2-sulfonyloxy) - 17β - trimethyl - silyloxy - 1,3,5(10)estratriene were obtained. M.P. 127–129° C.; $[α]_D$: ±0° (c.=1.0; dioxane).

1.10 g. 17α - ethinyl - 3 - (propane - 2 - sulfonyloxy)-17β - trimethyl - silyloxy - 1,3,5(10)estratriene were dissolved at room temperature in 110 ml. hydrochloric acid containing methanol. The solution was kept for 15 minutes at room temperature. It was then neutralized with a 5% sodium bicarbonate solution and thereafter concentrated in vacuo. The separated precipitate was collected by suction filtration, washed until neutral with water, dried by standing and recrystallized from acetone/n-hexane.

0.88 g. 17α - ethyinyl - 3 - (propane-2-sulfonyloxy)-17β - hydroxy - 1,3,5(10) - estratriene were thereby obtained. M.P. 160–161° C.; $[α]_D$: +3.5° (c.=1.0; chloroform); $ν_{max}$. 3615, 3315, 1610, 1500 (1350), 1365 cm.$^{-1}$ (chloroform).

EXAMPLE 2

17α-ethinyl-3-(butane-1-sulfonyloxy)-17β-hydroxy-1,3,5(10)-estratriene 1 g. of 17α - ethinyl - 3 - hydroxy - 17β - trimethylsilyloxy-1,3,5(10)-estratriene was dissolved in 27.4 ml. of a mixture of benzene and 2,4,6-trimethylpyridine and with stirring 1.40 ml. of butane-1-sulfonyl-chloride were added thereto at room temperature. The reaction mixture was kept for 2 hours at room temperature and then poured onto ice. After decomposition of the excess acid chloride, the solution was extracted with ether, washed until neutral with water, dried over sodium sulfate and concentrated in vacuo. In order to decolorize the residue, it was dissolved in a small amount of benzene and filtered through a thin layer of aluminum oxide (neutral, activity degree I). The benzene was removed in vacuo. A colorless, crystalline crude 17α - ethinyl - 3 - (butane-1-sulfonyloxy) - 17β - trimethyl - silyloxy-1,3,5(10)-estratriene was obtained. 0.912 g. of this crude product was dissolved at room temperature in 92 ml. of hydrochloric acid containing methanol. The solution was allowed to stand for 15 minutes at room temperature. After this, it was neutralized with a 5% hydrogen carbonate solution and concentrated in vacuo. 0.9 g. of an oily non-crystallizable 17α-ethinyl - 3 - (butane - 1 - sulfonyloxy) - 17β - hydroxy-1,3,5(10)estratriene were obtained. $ν_{max}$.: 3615, 3315, 1610, 1500, 1375 cm.$^{-1}$ (chloroform).

EXAMPLE 3

17α-ethinyl-3-(octane-1-sulfonyloxy)-17β-hydroxy-1,3,5(10)-estratriene

Using a method corresponding to that disclosed in Example 1, from 1 g. 17α - ethinyl - 3 - hydroxy - 17β - trimethylsilyloxy - 1,3,5(10) - estratriene, 23.8 ml. benzene and 6 ml. of a mixture of triethylamine and octane-1-sulfonylchloride, an oily crude product of 17α-ethinyl-3-(octane - 1 - sulfonyloxy) - 17β - hydroxy - 1,3,5(10)-estratriene was obtained which was purified from benzene solution chromatographically on aluminum oxide (neutral, activity degree I). 1.2 g. of an oily 17α - ethinyl-3-(octane - 1 - sulfonyloxy) - 17β - hydroxy-1,3,5(10)-estratriene were thereby obtained which did not crystallize. $ν_{max}$.: 3610, 3315, 1610, 1585, 1500, 1375 cm.$^{-1}$ (chloroform).

EXAMPLE 4

17β-(ethane-sulfonyloxy)-4-estrene-3-one

According to the procedure of Example 1, from 1 g. 19-nortestosterone, 32 ml. benzene and 6.9 ml. of a mixture of triethylamine and ethane sulfonylchloride, crystalline 17β-(ethane-sulfonyloxy) - 4 - estrene-3-one was obtained. M.P. 130–132° C.; $[α]_D$: +38° (CHCl$_3$); $ν_{max}$.: 1670, 1625, 1355, 1335, 1170 cm.$^{-1}$ (CHCl$_3$).

EXAMPLE 5

4-chloro-17β-(pentane-1-sulfonyloxy)-4-androstene-3-one

According to the procedure of Example 1, starting from 1 g. of 4-chlorotestosterone, 27 ml. of benzene and 13.1 ml. of a mixture of triethylamine and pentane-1-sulfonyl chloride, non-crystallizable 4-chloro - 17β - (pentane-1-sulfonyloxy) - 4 - androstene-3-one was obtained. $[α]_D$: +86° (CHCl$_3$); $ν_{max}$.: 1694, 1585, 1355, 1340, 1165 cm.$^{-1}$ (CHCl$_3$).

EXAMPLE 6

3β-(ethane-sulfonyloxy)-5-cholestene

According to the procedure of Example 1, starting from 1 g. chloresterine, 48 ml. benzene, and 7.35 ml. of a mixture of triethylamine and ethane sulfonylchloride, 3β - (ethane-sulfonyloxy) - 5 - cholestene was obtained. M.P. 131–133° C.; $[α]_D$: −37° (CHCl$_3$); $ν_{max}$.: 1357, 1340, 1167 cm.$^{-1}$ (CHCl$_3$).

EXAMPLE 7

17α-ethinyl-3-(ethane-sulfonyloxy)-17β-hydroxy-1,3,5(10)-estratriene

The process in this and the following examples was the same as in Example 1. Only the starting compounds were changed, as well as their amounts. Accordingly, from 1 g. of 17α-ethinyl - 3 - hydroxy - 17β - trimethylsilyloxy-1,3,5(10)-estratriene, a mixture of 28 ml. benzene and triethylamine and 1.03 ml. ethane-sulfonylchloride there was obtained a crystalline 17α-ethinyl - 3 - (ethane-sulfonyloxy) - 17β - hydroxy - 1,3,5(10) - estratriene. M.P. 137–139° C.; $[α]_D$: +3.5° (CHCl$_3$); $ν_{max}$.: 3615, 3315, 1605, 1495, 1370 cm.$^{-1}$ (CHCl$_3$).

EXAMPLE 8

17α-ethinyl-3-(propane-1-sulfonyloxy)-17β-hydroxy-1,3,5(10)-estratriene

Following the process disclosed in Example 1, there were used as starting compounds 1 g. of 17α-ethinyl-3-hydroxy - 17β - trimethylsilyloxy - 1,3,5(10) - estratriene, a mixture of 28 ml. benzene and triethylamine and 1.53 ml. propane - 1 - sulfonylchloride and at the end of the process there was obtained a crystalline 17α-ethinyl-3-(propane - 1 - sulfonyloxy) - 17β - hydroxy - 1,3,5(10)-estratriene. M.P. 97–99° C.; $[α]_D$: +9.5° (CHCl$_3$); $ν_{max}$.: 3618, 3320, 1615, 1590, 1500, 1380, 1180 cm.$^{-1}$ (CHCl$_3$).

EXAMPLE 9

17α-ethinyl-3-(propane-2-sulfonyloxy)-17β-acetoxy-1,3,5(10)-estratriene

The process was the same as in Example 1. The starting products were 0.92 g. 17α-ethinyl - 3 - hydroxy - 17β-acetoxy - 1,3,5(10) - estratriene, a mixture of 28 ml. benzene and triethylamine, and 1.22 ml. propane-2-sulfonylchloride. The final compound was a crystalline 17α-ethinyl - 3 - (propane - 2 - sulfonyloxy) - 17β - acetoxy-1,3,5(10) - estratriene. M.P. 131–133° C.; $[α]_D$: ±0° (CHCl$_3$); $ν_{max}$.: 3320, 1745, 1610, 1590, 1500, 1370, 1350, 1275, 1190 cm.$^{-1}$ (CHCl$_3$).

EXAMPLE 10

17α-ethinyl-3-(propane-2-sulfonyloxy)-17β-valerianoxy-1,3,5(10)-estratriene

The process was the same as in Example 1. The starting products were 1.035 g. of 17α-ethinyl - 3 - hydroxy-17β-valerianoxy - 1,3,5(10) - estratriene, a mixture comprising 28 ml. benzene and triethylamine and 1.22 ml. propane-2-sulfonylchloride. The final product obtained was 17α-ethyl - 3 - (propane - 2 - sulfonyloxy) - 17β - valerianoxy-1,3,5(10) - estratriene. $[\alpha]_D$: +15.3° (CHCl$_3$); $\nu_{max}$: 3320, 1755, 1615, 1585, 1500, 1370, 1355, 1190 cm.$^{-1}$ (CHCl$_3$).

EXAMPLE 11

17α-chloroethinyl-3-(propane-2-sulfonyloxy)-17β-hydroxy-1,3,5(10)-estratriene

The starting products were 1.09 g. 17α-chloroethinyl-3 - hydroxy - 17β - trimethylsilyloxy-1,3,5(10)-estratriene, 28 ml. of a mixture of benzene and triethylamine and 1.22 ml. propane-2-sulfonyl bromide. There was obtained a crystalline 17α - chloroethinyl - 3 - (propane - 2 - sulfonyloxy) - 17β - hydroxy - 1,3,5(10) - estratriene. M.P. 153–155° C.; $\nu_{max}$: 3620, 2230, 1615, 1590, 1500, 1370, 1355, 1190 cm.$^{-1}$ (CHCl$_3$).

EXAMPLE 12

3-(propane-2-sulfonyloxy)-1,3,5(10)-estratriene-17-one

The starting products were 1 g. of estrone, a mixture amounting to 31 ml. comprising triethylamine and nitromethane, and 2.1 ml. propane-2-sulfonylchloride. By the process described in Example 1, there was obtained a crystalline 3-(propane - 2 - sulfonyloxy)-1,3,5(10)-estratriene-17-one. M.P. 189–191° C.; $[\alpha]_D$: +118.5° (CHCl$_3$); $\nu_{max}$: 1745, 1615, 1590, 1500, 1370, 1355, 1190 cm.$^{-1}$ (CHCl$_3$).

EXAMPLE 13

3-(propane-2-sulfonyloxy)-17β-valerianoxy-1,3,5(10)-estratriene

The process was again the same as in Example 1. The starting products 1 g. of 3-hydroxy-17β-valerianoxy-1,3,5(10)-estratriene, 27.8 ml. of a mixture of benzene and triethylamine and 1.5 ml. propane-2-sulfonyl chloride. The final product obtained was a crystalline 3-(propane-2-sulfonyloxy - 17β - valerianoxy - 1,3,5(10) - estratriene. M.P. 102–103° C.; $[\alpha]_D$: +31° (CHCl$_3$); $\nu_{max}$: 1733, 1615, 1590, 1500, 1370, 1355, 1185 cm.$^{-1}$ (CHCl$_3$).

EXAMPLE 14

3β-(propane-2-sulfonyloxy)-5-pregnene-20-one

The process was the same as in Example 1. The starting products were 1.7 g. of 3β-hydroxy-5-pregnene-20-one, 62.6 ml. of a mixture of benzene and triethylamine and 3.02 ml. propane-2-sulfonylchloride. The final product was a crystalline 3β-(propane-2-sulfonyloxy)-5-pregnene-20-one. M.P. 140–142° C.; $[\alpha]_D$: +21.7° (CHCl$_3$); $\nu_{max}$: 1700, 1355, 1335, 1180 cm.$^{-1}$ (CHCl$_3$).

EXAMPLE 15

Prednisone-21-(propane-2-sulfonate)

The process was the same as in Example 1. The starting products were 1 g. of prednisone, 57 ml. of a mixture of nitromethane and triethylamine and 3 ml. propane-2-sulfonyl chloride. There was obtained as final product a crystalline prednisone - 21-(propane-2-sulfonate). M.P. 195–198° C.; $[\alpha]_D$: +170° (CHCl$_3$); $\nu_{max}$: 3310, 1745, 1720, 1665, 1625, 1610, 1355, 1190 cm.$^{-1}$ (KBr).

EXAMPLE 16

17α-ethinyl-3-(butane-2-sulfonyloxy)-17β-hydroxy-1,3,5(10)-estratriene

The process was the same as in Example 1. The starting products were 1 g. of 17α-ethinyl-3-hydroxy-17β-trimethylsilyloxy-1,3,5(10)-estratriene, 28 ml. of a mixture of benzene and triethylamine and 1.75 ml. butane-2-sulfonyl bromide. As final product there was obtained a crystalline 17α-ethinyl-3-(butane - 2 - sulfonyloxy)-17β-hydroxy-1,3,5(10)-estratriene. M.P. 109–115° C.; $[\alpha]_D$: ±0° (CHCl$_3$); $\nu_{max}$: 3615, 3320, 1610, 1590, 1500, 1370, 1185 cm.$^{-1}$ (CHCl$_3$).

EXAMPLE 17

17α-ethinyl-3-(2-methyl-propane-1-sulfonyloxy)-17β-hydroxy-1,3,5(10)-estratriene The process was the same as in Example 1. The starting products were 1 g. of 17α-ethinyl-3-hydroxy-17β-trimethylsilyloxy-1,3,5(10)-estratriene, 28 ml. of a mixture of benzene and triethylamine and 1.75 ml. 2-methyl-propane-1-sulfonylchloride. As final product there was obtained a crystalline 17α-ethinyl-3-(2-methyl-propane-1-sulfonyloxy)-17β-hydroxy-1,3,5(10)-estratriene. M.P. 92–95° C.; $[\alpha]_D$: +3° (CHCl$_3$); $\nu_{max}$: 3615, 3320, 1610, 1585, 1500, 1375, 1180 cm.$^{-1}$ (CHCl$_3$).

EXAMPLE 18

17α-ethinyl-3-(pentane-1-sulfonyloxy)-17β-hydroxy-1,3,5(10)-estratriene

The process was the same as in Example 1. The starting products were 1 g. of 17α-ethinyl-3-hydroxy-17β-trimethylsilyloxy-1,3,5(10)-estratriene, 28 ml. of a mixture of benzene and triethylamine and 1.57 ml. pentane-1-sulfonylbromide. There was obtained an oily, non-crystalline 17α-ethinyl - 3 - (pentane - 1 - sulfonyloxy)-17β-hydroxy-1,3,5(10)-estratriene. $[\alpha]_D$: +2.5° (CHCl$_3$); $\nu_{max}$: 3615, 3320, 1615, 1590, 1500, 1380, 1180 cm.$^{-1}$ (CHCl$_3$).

EXAMPLE 19

17α-ethinyl-3-(pentane-3-sulfonyloxy)-17β-hydroxy-1,3,5(10)-estratriene

In this example the same method was used as in Example 1. From 1 g. of 17α-ethinyl-3-hydroxy-17β-trimethylsilyloxy-1,3,5(10)-estratriene, 28 ml. of a mixture of benzene and triethylamine and 2.0 ml. pentane-3-sulfonylchloride, there was obtained an oily non-crystalline product identified as 17α-ethinyl-3-(pentane-3-sulfonyloxy)-17β - hydroxy - 1,3,5(10) - estratriene. $[\alpha]_D$: +4.2° (CHCl$_3$); $\nu_{max}$: 3620, 3320, 1615, 1590, 1500, 1370, 1185 cm.$^{-1}$ (CHCl$_3$).

EXAMPLE 20

17α-ethinyl-3-(3-methyl-butane-1-sulfonyloxy)-17β-hydroxy-1,3,5(10)-estratriene

In this example the method was again the same as in Example 1 except for the starting products. From 1 g. of 17α - ethinyl-3-hydroxy-17β-trimethylsilyloxy-1,3,5-(10)-estratriene, 28 ml. of a mixture of benzene and triethylamine and 2.0 ml. of 3-methyl-butane-1-sulfonylchloride, there was obtained an oily, non-crystallizable product identified as 17α - ethinyl-3-(3-methyl-butane-1-sulfonyloxy) - 17β - hydroxy-1,3,5(10)-estratriene. $[\alpha]_D$: +8.8° (CHCl$_3$); $\nu_{max}$: 3620, 3320, 1615, 1590, 1500, 1310, 1180 cm.$^{-1}$ (CHCl$_3$).

EXAMPLE 21

17α-ethinyl-3-(cyclopentanesulfonyloxy)-17β-hydroxy-1,3,5(10)-estratriene

The process was again the same as in Example 1 except for the starting products. From 1 g. of 17α-ethinyl-3-hydroxy-17β-trimethylsilyloxy-1,3,5(10)-estratriene, 28 ml. of a mixture of benzene and triethylamine, and 1.73 ml. cyclopentane-sulfonylchloride, there was obtained a crystalline product identified as 17α-ethinyl-3-(cyclopentanesulfonyloxy) - 17β - hydroxy-1,3,5(10)-estratriene. M.P. 162–164° C.; $[\alpha]_D$: +13.9° (CHCl$_3$); $\nu_{max}$: 3615, 3315, 1610, 1590, 1505, 1385, 1180 cm.$^{-1}$ (CHCl$_3$).

EXAMPLE 22

17α-ethinyl-3-(cyclopentanesulfonyloxy)-17β-acetoxy-1,3,5(10)-estratriene

The process was the same as in Example 1. The starting products were 0.92 g. of 17α-ethinyl-3-hydroxy-17β-acetoxy-1,3,5(10)-estratriene, 28 ml. of a mixture of benzene and triethylamine and 1.73 ml. cyclopentanesulfonylchloride. There was obtained a crystalline 17α-ethinyl-3-(cyclopentanesulfonyloxy) - 17β-acetoxy-1,3,5(10)-estratriene. M.P. 151–153° C.; [α]$_D$: +15° (CHCl$_3$); $\nu_{max.}$ 3320, 1750, 1615, 1590, 1500, 1375, 1275, 1180 cm.$^{-1}$ (CHCl$_3$).

EXAMPLE 23

17α-ethinyl-3-(cyclopentanesulfonyloxy)-17β-valerianoxy-1,3,5(10)-estratriene The process was the same as in Example 1. The starting products were 1.035 g. of 17α - ethinyl-3-hydroxy-17β-valerianoxy-1,3,5(10)-estratriene, 28 ml. of a mixture of benzene and triethylamine and 1.73 ml. cyclopentanesulfonylchloride. There was obtained 17α-ethinyl-3-cyclopentanesulfonyl) - 17β - valerianoxy - 1,3,5(10)-estratriene. [α]$_D$: +11.3° (CHCl$_3$); $\nu_{max.}$: 3320, 1755, 1615, 1590, 1500, 1375, 1185 cm.$^{-1}$ (CHCl$_3$).

EXAMPLE 24

17α-chloroethinyl-3-(cyclopentanesulfonyloxy)-17β-hydroxy-1,3,5(10)-estratriene The process was the same as in Example 1. The starting products were 1.09 g. of 17α-chloroethinyl-3-hydroxy-17β-trimethylsilyloxy-1,3,5(10)-estratriene, 28 ml. of a mixture of benzene and 2,6-dimethylpyridine and 1.73 ml. cyclopentanesulfonylchloride. There was obtained 17α-chloroethinyl - 3 - (cyclopentanesulfonyloxy) - 17β-hydroxy-1,3,5(10)-estratriene. $\nu_{max.}$: 3620, 2230, 1615, 1590, 1500, 1375, 1180 cm.$^{-1}$ (CHCl$_3$).

EXAMPLE 25

17α-ethinyl-3-(cyclohexanesulfonyloxy)-17β-hydroxy-1,3,5(10)-estratriene

The process was the same as in Example 1. The starting products were 1 g. of 17α-ethinyl-3-hydroxy-17β-trimethylsilyloxy-1,3,5(10)-estratriene, 28 ml. of a mixture of benzene and triisopropylamine and 2.02 ml. cyclohexanesulfonylbromide. There was obtained an oily non-crystalline 17α-ethinyl-3-(cyclohexanesulfonyloxy)-17β-hydroxy-1,3,5(10)-estratriene. [α]$_D$: +5.5° (CHCl$_3$); $\nu_{max.}$ 3620, 3320, 1610, 1500, 1375, 1180 cm.$^{-1}$ (CHCl$_3$).

EXAMPLE 26

17α-ethinyl-3-(toluene-α-sulfonyloxy)-17β-hydroxy-1,3,5(10)-estratriene

The process was the same as in Example 1. The starting products were 1 g. of 17α-ethinyl-3-hydroxy-17β-trimethylsilyloxy-1,3,5(10)-estratriene, 28 ml. of a mixture of benzene and triisopropylamine and 2.58 g. of toluene-α-sulfonylchloride. There was obtained an oily, non-crystalline 17α - ethinyl-3-(toluene-α-sulfonyloxy)-17β-hydroxy-1,3,5(10) - estratriene. [α]$_D$: +10.5° (CHCl$_3$); $\nu_{max.}$: 3615, 3320, 1610, 1590, 1500, 1380, 1180 cm.$^{-1}$ (CHCl$_3$).

EXAMPLE 27

17α-ethinyl-3-(diethylamino-sulfonyloxy)-17β-hydroxy-1,3,5(10)-estratriene

The process was the same as in Example 1. The starting products were 1 g. of 17α-ethinyl-3-hydroxy-17β-trimethylsilyloxy-1,3,5(10)-estratriene, 28 ml. of a mixture of benzene and triethylamine and 1.90 ml. diethylaminosulfonylchloride. There was obtained a crystalline product which was 17α-ethinyl-3-(diethylamino-sulfonyloxy)-17β-hydroxy-1,3,5(10)-estratriene. M.P. 113–116° C.; [α]$_D$: +13.8° (CHCl$_3$); $\nu_{max.}$: 3620, 3320, 1615, 1590, 1500, 1380, 1180 cm.$^{-1}$ (CHCl$_3$).

EXAMPLE 28

17α-ethinyl-3-(pyrrolidino-sulfonyloxy)-17β-hydroxy-1,3,5(10)-estratriene

The process was the same as in Example 1. The starting products were 1 g. of 17α-ethinyl-3-hydroxy-17β-trimethylsilyloxy-1,3,5(10)-estratriene, 28 ml. of a mixture of benzene and collidine and 1.66 ml. of pyrrolidinosulfonylchloride. There was obtained a crystalline product which was 17α-ethinyl - 3 - (pyrrolidino - sulfonyloxy)-17β-hydroxy-1,3,5(10)-estratriene, M.P. 116–122° C.; [α]$_D$: +10.5° (CHCl$_3$); $\nu_{max.}$: 3620, 3320, 1615, 1590, 1500, 1385, 1180 cm.$^{-1}$ (CHCl$_3$).

EXAMPLE 29

17α-ethinyl-3-(piperidino-sulfonyloxy)-17β-hydroxy-1,3,5(10)-estratriene

The process was the same as in Example 1. The starting products were 1 g. of 17α-ethinyl-3-hydroxy-17β-trimethylsilyloxy-1,3,5(10)-estratriene, 28 ml. of a mixture of benzene and triethylamine and 1.95 ml. of piperidinosulfonyl chloride. There was obtained a crystalline product which was 17α-ethinyl-3-(piperidino-sulfonyloxy)-17β-hydroxy-1,3,5(10)-estratriene, M.P. 103–109° C.; [α]$_D$: −4.25° (CHCl$_3$); $\nu_{max.}$: 3615, 3320, 1615, 1590, 1500, 1385, 1195 cm.$^{-1}$ (CHCl$_3$).

What is claimed is:

1. A compound of the formula

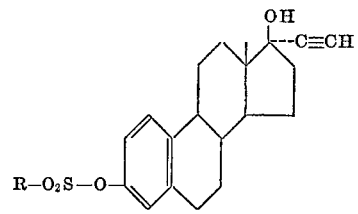

wherein R is

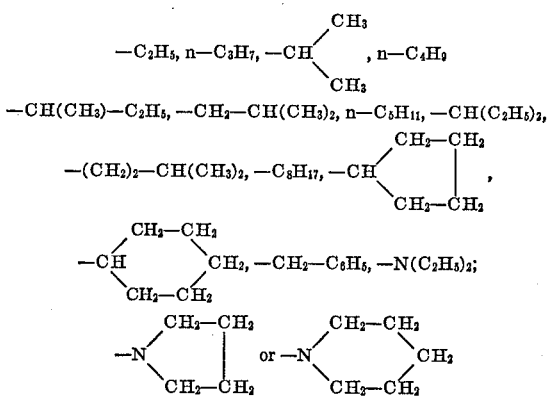

2. A compound according to claim 1 designated 17α-ethinyl - 3 - (propane - 2 - sulfonyloxy)-17β-hydroxy-1,3,5(10)-estratriene.

3. A compound according to claim 1 designated 17α-ethinyl - 3 - (butane - 1 - sulfonyloxy)-17β-hydroxy-1,3,5(10)-estratriene.

4. A compound according to claim 1 designated 17α-ethinyl-3-(octane - 1 - sulfonyloxy) - 17β - hydroxy-1,3,5(10)-estratriene.

5. A compound according to claim 1 designated 17α-ethinyl-3-(ethane - 1 -sulfonyloxy)-17β-hydroxy - 1,3,5(10)-estratriene.

6. A compound according to claim 1 designated 17α-ethinyl - 3 - (propane-1-sulfonyloxy)-17β-hydroxy - 1,3,5(10)-estratriene.

7. 17α-ethinyl - 3 - (propane - 2 - sulfonyloxy) - 17β-acetoxy-1,3,5(10)-estratriene.

8. 17α-ethinyl - 3 - (propane - 2 - sulfonyloxy) - 17β-valerianoxy-1,3,5(10)-estratriene.

9. A compound according to claim 1 designated 17α-ethinyl - 3 - (butane-2-sulfonyloxy) - 17β - hydroxy-1,3,5(10)-estratriene.

10. A compound according to claim 1 designated 17α-ethinyl - 3 - (2-methyl-propane - 1 - sulfonyloxy) - 17β-hydroxy-1,3,5(10)-estratriene.

11. A compound according to claim 1 designated 17α-ethinyl - 3 - (pentane - 1 - sulfonyloxy) - 17β - hydroxy-1,3,5(10)-estratriene.

12. A compound according to claim 1 designated 17α-ethinyl - 3 - (pentane - 3 - sulfonyloxy) - 17β - hydroxy-1,3,5(10)-estratriene.

13. A compound according to claim 1 designated 17α-ethinyl - 3 - (3-methyl-butane - 1 - sulfonyl)-17β-hydroxy-1,3,5(10)-estratriene.

14. A compound according to claim 1 designated 17α-ethinyl - 3 - (cyclopentane-sulfonyloxy) - 17β - hydroxy-1,3,5(10)-estratriene.

15. 17α - ethinyl - 3 - (cyclopentane-sulfonyloxy) - 17β-acetoxy-1,3,5(10)-estratriene.

16. 17α-ethinyl - 3 - (cyclopentane-sulfonyloxy) - 17β-valerianoxy-1,3,5(10)-estratriene.

17. A compound according to claim 1 designated 17α-ethinyl - 3 - (cyclohexane-sulfonyloxy)-17β-hydroxy-1,3,5(10)-estratriene.

18. A compound according to claim 1 designated 17α-ethinyl - 3 - (toluene-α-sulfonyloxy) - 17β - hydroxy-1,3,5(10)-estratriene.

19. A compound according to claim 1 designated 17α-ethinyl - 3 - (diethylamino-sulfonyloxy) - 17β - hydroxy-1,3,5(10)-estratriene.

20. A compound according to claim 1 designated 17α-ethinyl - 3 - (pyrrolidino-sulfonyloxy)-17β-hydroxy-1,3,5(10)-estratriene.

21. A compound according to claim 1 designated 17α-ethinyl - 3 - (piperidino-sulfonyloxy) - 17β - hydroxy-1,3,5(10)-estratriene.

References Cited

UNITED STATES PATENTS

| 3,522,281 | 7/1970 | Anner et al. | 260—397.5 |
| 3,580,937 | 5/1971 | Allen et al. | 260—397.4 |

FOREIGN PATENTS

| 996,309 | | Great Britain | 260—397.5 |

OTHER REFERENCES

Fieser et al.: "Steroids" (1959), p. 476 relied on.
Chem. Abstracts, vol. 52 (1968), par. 17.627b.

ELBERT L. ROBERTS, Primary Examiner

U.S. Cl. X.R.

260—397.5, 397.2, 397.4, 397.45